United States Patent [19]
Schmidt

[11] Patent Number: 4,748,340
[45] Date of Patent: May 31, 1988

[54] LOAD SHARE SYSTEM

[75] Inventor: Robert J. Schmidt, Bolton, Mass.

[73] Assignee: Liberty Engineering, Inc., Waltham, Mass.

[21] Appl. No.: 931,253

[22] Filed: Nov. 17, 1986

[51] Int. Cl.[4] .......... H02J 1/04; H02J 1/10
[52] U.S. Cl. .......... 307/53; 307/58; 307/60; 323/907; 363/71
[58] Field of Search .......... 307/44, 45, 46, 48, 307/53, 55, 58, 60, 64, 82; 363/71; 323/234, 267, 907

[56] References Cited

U.S. PATENT DOCUMENTS 4,035,716 7/1977 Hutchinson .......... 363/81
4,276,590 6/1981 Hansel et al. .......... 363/71
4,356,403 10/1982 Mohat .......... 307/60
4,618,779 10/1986 Wiscombe .......... 307/60

*Primary Examiner*—William H. Beha, Jr.
*Attorney, Agent, or Firm*—Joseph S. Iandiorio; Douglas E. Denninger

[57] ABSTRACT

A load share system which connects to the power outputs of two power supplies to determine any deviation of the output currents relative to each other and provides a correction signal representative of the deviation. The system generates two balance signals of similar magnitude and opposite polarity and delivers one of the balance signals to a sense input of one power supply and the other signal to a sense input of the other power supply to balance the power outputs.

27 Claims, 3 Drawing Sheets

LOAD SHARE SYSTEM

FIELD OF THE INVENTION

This invention relates to a load share system which balances the power output of dual power supplies and more particularly to such a system which provides balance signals directly to a sense input of each power supply.

BACKGROUND OF INVENTION

There are a number of applications in which it is desirable to provide a constant voltage to a load. It is preferable to connect two power supplies to a common load to increase the lifetime of each supply and provide a backup if one fails. However, coordination of the power outputs of dual power supplies presents several problems.

Most power supplies are provided with positive and negative sense terminals which connect directly to the load. By connecting directly to the load, the sense terminals monitor the voltage across the load itself and eliminate effects of impedance in the output lines between the power terminals and the load. The power supply holds its output voltage steady when the voltage across the positive and negative sense terminals equals the rated voltage of the power supply. A difference between the sensed voltage and the rated voltage causes the power supply to alter its output.

When the sense terminals of two power supplies are connected independently to a common load, discrepancies in the output currents can arise: frequently, misadjustments in one or both power supplies cause the power supplies to seek a sensed voltage which is different from the expected, rated voltage. More strain is then placed on one of the power supplies if the other power supply provides less than the rated voltage, and improper voltages may be applied across the load.

Several conventional systems attempt to balance the current outputs to and voltage across a common load. One utilizes a master-slave arrangement in which the master power supply commands the slave to track a designated amount of current. However, if the master power supply fails or is switched off, the slave power supply simply tracks the output of the master to zero current rather than compensating for the diminished current. This arrangement is used primarily to provide a higher level of current than is available from a single power supply.

Another system utilizes load sharing circuits which are located within each of two power supplies and communicate directly with each other. Each load sharing circuit works with the other circuit to control the current output of both power supplies. Since these load sharing circuits are integrated into their respective power supplies, they are dedicated to the rated voltages and currents of those power supplies. Consequently, the load sharing circuits are not transferable and, even if they were, they could not accommodate different voltage and current environments.

SUMMARY OF INVENTION

It is therefore an object of this invention to provide an improved load share system for balancing the power provided by two power supplies to a common load.

It is a further object of this invention to provide such a system which connects directly to a conventional sense input of each power supply.

It is a further object of this invention to provide such a system whose sensitivity can be adjusted to accommodate a wide range of load currents.

It is a further object of this invention to provide such a system which can automatically reconnect the sense terminals directly to the load when the power outputs of the power supplies differ by more than a predetermined amount.

It is a further object of this invention to provide such a system which enables a single power supply to be replaced without disturbing full voltage to the load as provided by the other power supply.

It is a further object of this invention to provide such a system which can reconnect the sense terminals upon component failure within the system to avoid interruption of voltage across the load.

A still further object of this invention is to provide such a system which during start-up can gradually increase balance signals to avoid oscillation and overcorrection of voltage supplied to the load.

It is a further object of this invention to provide such a system whose correction signals can operate proximate ground level for the load.

It is a further object of this invention to provide such a system which, by balancing the output currents, serves to average the calibrated voltages of the power supplies.

This invention results from the realization that truly effective balancing of the power outputs of dual power supplies can be achieved by a separate load share system which determines the relative difference between the output currents of the power supplies and provides bipolar signals representative of the difference to the sense terminals of the power supplies to increase the voltage of the underproducing supply while decreasing the voltage of the overproducing supply.

This invention features a load share system. There are means, connectable to the power outputs of two power supplies, for determining any deviation of the output currents relative to each other, and means for providing a correction signal representative of the deviation. There is also means, responsive to the correction signal, for generating two balance signals of similar magnitude and opposite polarity and for delivering one of the balance signals to a sense input of one power supply and the other signal to the sense input of the other power supply to balance the power outputs.

In one embodiment, the means for determining includes means for distinguishing any discrepancy between at least one of the output currents and the average of them. The means for distinguishing may include means for obtaining the ratio of one of the output currents to the average of them. The means for providing includes means for combining the discrepancy with a gain factor to produce a deviation signal and further includes means for diminishing the deviation signal by the gain factor to provide the correction signal. The means for providing may further include means for controlling the magnitude of the correction signal to adjust the sensitivity of the load share system to deviations in current and means, responsive to the means for diminishing, for adjusting the voltage of the correction signal to set the maximum voltage drift between the power supplies accommodatable by the load share system.

In another embodiment, the system further includes a gain factor circuit having a gain generator for providing the gain factor. The gain factor circuit may further include a start switch for initiating the gain generator to provide the gain factor and a ramp generator, responsive to the start switch, for slowly increasing the gain factor until it reaches a predetermined level. The system may further include a comparator circuit for disabling the gain generator when the correction signal exceeds a predetermined amount.

In yet another embodiment, the system further includes means, responsive to the magnitude of the balance signals, for detecting a fault in the control system. The fault detecting means may include a window comparator to determine when the magnitude exceeds a preselected level and the system may further include means, responsive to the fault detecting means, for disconnecting the means for generating from the power supplies. The means for disconnecting includes means for reconnecting the sense inputs directly to the load powerable by the power supplies. The means for generating delivers the balance of signals to the negative sense inputs of the power supplies and the balance signals are substantially identical in magnitude.

This invention also features a load share system including means, connectable to the power outputs of the two power supplies, for determining any deviation of the output currents relative to each other by obtaining the ratio of one of the output currents and the average of them, and the means for providing a correction signal representative of the deviation by multiplying the ratio of the gain factor and subtracting the gain factor from the product. The system further includes means, responsive to the correction signals, for generating two balance signals of similar magnitude and opposite polarity and for delivering one of the balance signals to a sense input of one power supply and the other signal to a sense input of the other power supply to balance the power outputs.

DISCLOSURE OF PREFERRED EMBODIMENT

Other objects, features and advantages will occur from the following description of a preferred embodiment and the accompanying drawings, in which.

This invention may be accomplished by a system which connects directly to a conventional sense terminal and taps the positive output terminal of each of two conventional power supplies and determines the difference of the output currents relative to each other as they are provided to a common load. The load share system generates balance signals of substantially identical magnitude and opposite polarity and delivers one of the balance signals to the sense terminal of one power supply and the other balance signal to the sense terminal of the other power supply to command each power supply to produce the same amount of current.

Figure 1:
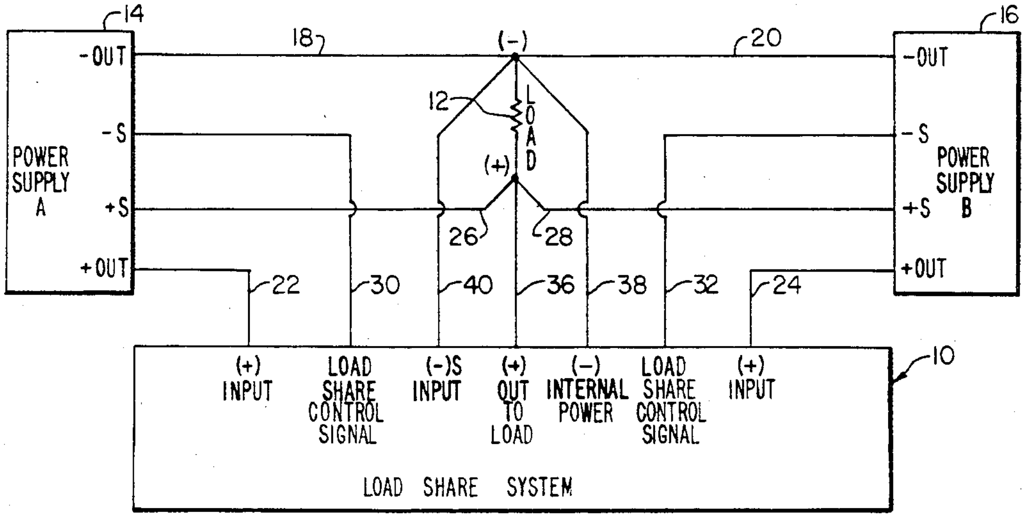
FIG. 1 is a schematic of a load share system according to this invention connected to two conventional power supplies.

There is shown in FIG. 1 a dual power supply load share system 10 according to this invention interconnected with load 12 and two conventional regulated power supplies 14 and 16, power supply A and power supply B, respectively. The negative terminal of each power supply is connected through lines 18 and 20 to the negative terminal of load 12. The positive terminal of each power supply is connected through power lines 22 and 24 to the positive inputs of load share system 10. The positive sense terminals of the power supplies are connected over lines 26 and 28 to the positive terminal of load 12 and the negative sense terminals are connected to load share system 10 through sense lines 30 and 32. In other words, the negative terminal and positive sense terminal of each power supply 14, 16 are conventionally connected to load 12 while the positive terminal and negative sense terminal of each power supply 14, 16 are connected to load share system 10.

Positive power lines 22 and 24 each connect through a diode and a shunt resistor to common power line 36 which is in turn connected to the positive terminal of load 12. This configuration enables load share system 10 to monitor the current flow from each of the power supplies 14 and 16 to load 12. Moreover, common power line 36 in conjunction with line 38 provides power to operate the circuits of load share system 10 itself.

Line 40 interconnects with the negative terminal of load 12 and provides a negative sensing input to load share system 10 during normal load share operation. If a fault within load share system 10 arises or for any other reason the load share system is shut down, line 40 is then connected internally directly back to sense lines 30 and 32 to cut the load share system 10 completely out of the sensing circuit and permit the two power supplies 14 and 16 to operate independently as conventionally designed. This feature also permits exchange of one power supply while the other continues to provide power to load 12 without interruption.

Figure 2:
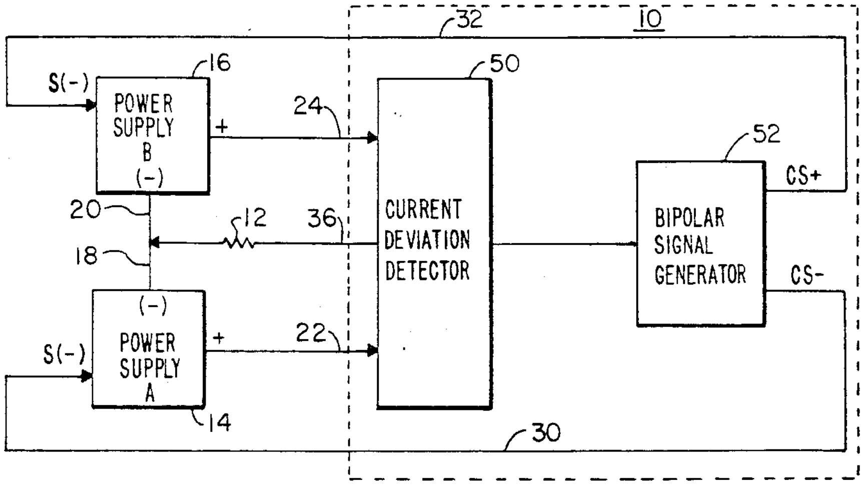
FIG. 2 is a more detailed block diagram of the load share system of FIG. 1.

Load share system 10, FIG. 2, includes a current deviation detector 50 which senses any difference in the current produced by power supplies 14 and 16 through power lines 22 and 24 and provides a correction signal indicative thereof to bipolar signal generator 52. Bipolar signal generator 52 provides mirror image positive and negative correction signals on sense lines 30 and 32 to increase the voltage of the underproducing power supply and decrease the voltage of the overproducing power supply. The correction signals operate about ground level for load 12 and are therefore independent of the magnitude of the power supply output voltage.

Figure 3A:
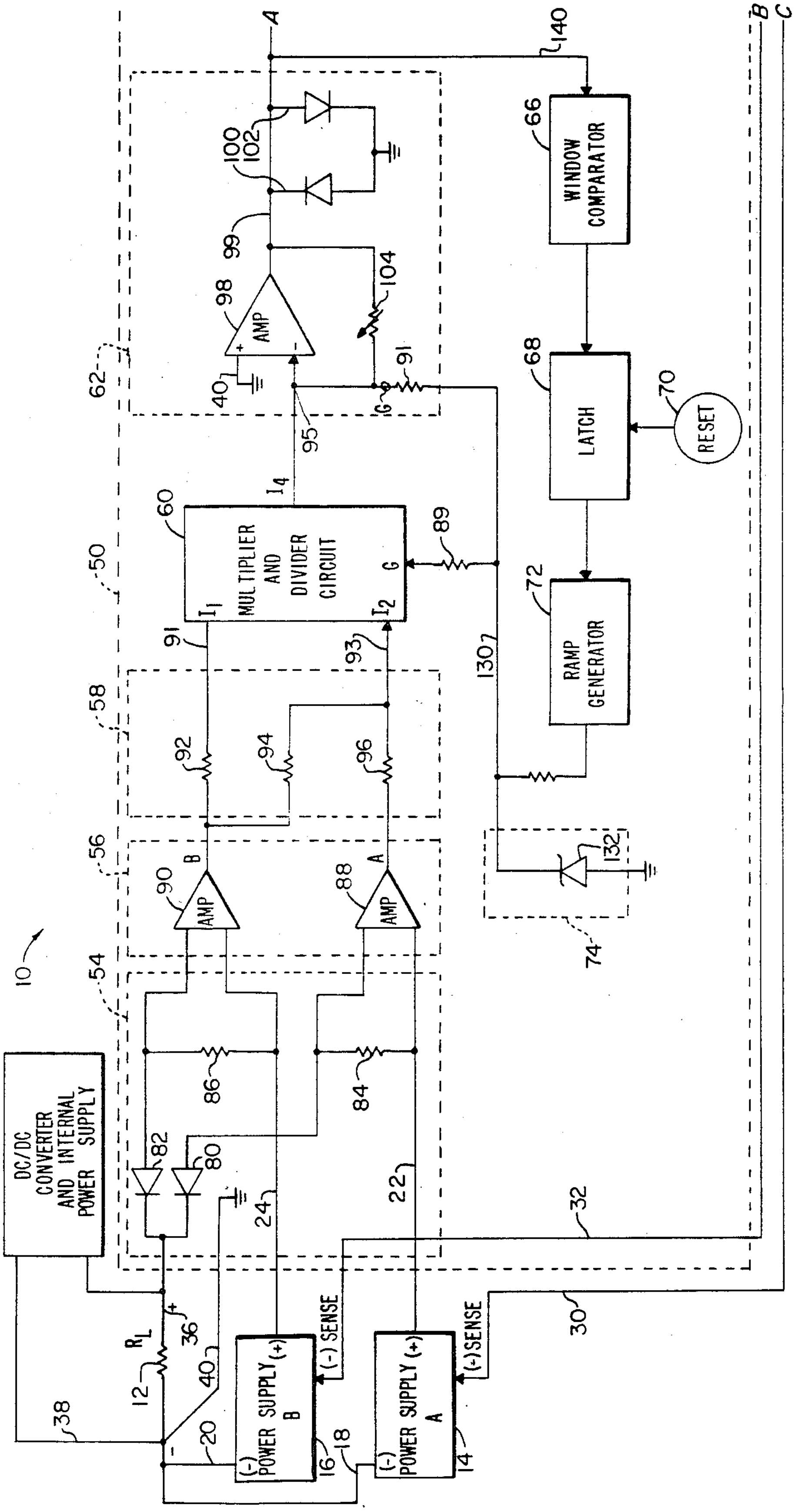
FIGS. 3A and 3B are more detailed schematics of the load share system of FIGS. 1 and 2.
Figure 3B:
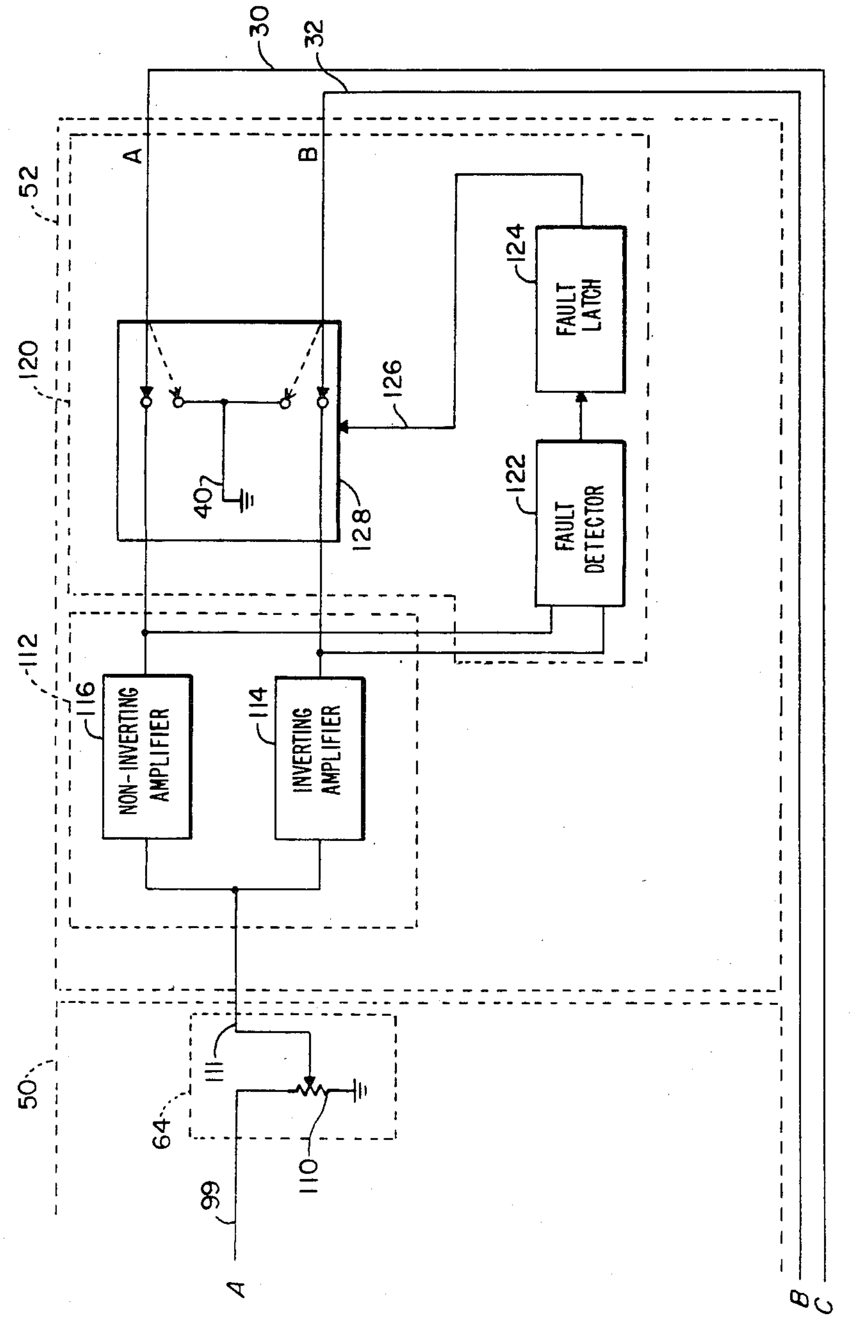

Load share system 10 is shown in greater detail in FIGS. 3A and 3B. Current deviation detector 50 includes shunt circuit 54, shunt amplifier circuit 56, averaging circuit 58, multiplier and divider circuit 60, deviation control circuit 62, and drift control circuit 64. In this construction, current deviation detector 50 also includes window comparator 66, latch 68, reset 70, ramp generator 72 and slope limit 74.

The construction and operation of the components within current deviation detector 50 and bipolar signal generator 52 are as follows. Shunt circuit 54 includes a pair of isolating diodes 80, 82 interconnected between the positive terminal of load 12 and respective shunt resistors 84 and 86. The voltage across resistors 84 and 86 is indicative of the current through them, thus enabling amplifiers 88 and 90 of shunt amplifier circuit 56 to accurately sense the current supplied to load 12.

The outputs from shunt amplifiers 88 and 90 are averaged in averaging circuit 58 which includes a first resistor 92 interconnected directly between amplifier 90 and the current $I_1$ input of multiplier-divider circuit 60 and a pair of resistors 94 and 96 each of which is twice the resistance of resistor 92. For example, resistor 92 is 20 K ohms and resistors 94 and 96 are 40 K ohms. Resistor 96 is connected directly from amplifier 88 to current $I_2$ input of multiplier-divider circuit 60 while resistor 94 is connected from the output of amplifier 90 to the current $I_2$ input. Thus current $I_1$, provided through line 91, represents the current presently being supplied by power supply 14 while the current $I_2$ input, provided through line 93, represents the average of the currents being supplied by each of the power supplies. Multiplier-divider circuit 60 calculates output current $I_4$, a deviation signal, according to the formula:

$$I_4=(I_1/I_2)G$$

by first determining the ratio of current $I_1$ to current $I_2$ and then multiplying it by gain factor G.

By providing the current from one power supply through line 91 and providing the average of both currents through line 93, averaging circuit 58 enables multiplier and divider circuit 60, without determining the actual magnitude of the currents, to produce a deviation signal which varies by the same amount whether the current from power supply A or that of power supply B increases or decreases with respect to the other current. For example, if power supply A is producing 3 units of current and power supply B is producing 2 units of current, the power outputs are balanced when each power supply produces 2.5 units of current. The output of each power supply must be either increased or decreased by 0.5 units. Determining and balancing the actual magnitudes of the output currents is avoided by balancing the ratio of the currents. However, when measured in terms of percent change using each current as the divisor, the output of power supply A must be decreased by 16.7% (0.5/3.0) while the output of power supply must be increased by 25% (0.5/2.0) in order to balance the two outputs. Instead, by dividing the required change of 0.5 units by the average of the currents, a 20% change is measured in both directions. Similarly, a uniform increment of change is obtained using one of the currents as the dividend and the average as the divisor: 2 units is 80% of 2.5 units; and 3 units is 120% of 2.5 units. In either case, a 20% change is measured by multiplier and divider circuit 60. Gain factor G increases the magnitude of change, represented by $(I_1/I_2)$, observed by current deviation detector 50 but does not alter its relationship to the two currents.

The output deviation signal $I_4$ is then fed to amplifier 98 in deviation control circuit 62. As represented by junction 95, the same gain as in multiplier and divider circuit 60 is subtracted from deviation signal $I_4$ to provide an output uniquely defining the difference in the current presently being supplied by the two power supplies. By subtracting the same gain factor as previously used to multiply the $I_1$:$I_2$ ratio, circuit 62 is assured of producing a zero correction signal when current signals $I_1$ and $I_2$ are equal. In this construction, deviation signal $I_4$ is a negative signal and therefore gain factor G, a positive signal, is effectively subtracted by adding it to deviation signal $I_4$. Resistors 89 and 91 have the same value, e.g., 2.5 K ohms. Further, a terminal of amplifier 98 is connected to load ground 40 to ensure that deviation circuit 62 operates about ground level for load 12.

Clamping diodes 100 and 102 are used to limit the maximum level of the correction signal in both the positive and negative directions. Potentiometer 104 adjusts the magnitude of the correction signal output of amplifier 98 with respect to the signal level at junction 95. This increases the sensitivity of load share system 10 allowing it to correct for even small deviations in the output currents of the two power supplies. The actual increase imparted to the correction signal depends also on the size of gain factor G as shown in FIG. 3A.

The correction signal is then fed on line 99 from deviation control circuit 62 to drift control circuit 64 which again scales the correction signal to set the maximum voltage drift between the two power supplies at which the system will operate. Drift control circuit 64 includes a potentiometer 110, FIG. 3B, utilized as a voltage divider. The correction signal is then fed on line 111 to the complementing circuit 112 in bipolar signal generator 52. Circuit 112 includes inverting amplifier 114 and non-inverting amplifier 116 which create mirror images of the correction signal and feed them directly to the sense lines 32 and 30 of the power supply units 16 and 14, respectively.

Also included in the bipolar signal generator circuit 52 is fault detector circuit 120 which includes a fault detector 122, such as a window comparator which detects whether the outputs of amplifiers 114 and 116 exceed a certain value, e.g. 0.07 volts, in either the positive or negative direction. If they do, fault latch 124 operates through line 126 to de-energize relay 128 so that lines 30 and 32 are disconnected from amplifiers 116 and 114 respectively and interconnected with each other through ground 40.

The universality of this load share system, that is, its ability to be used with any available pair of power supplies, depends in part on deviation control circuit 62 and the drift control circuit 64. Once the load share system is installed on a pair of power supplies, the maximum current deviation allowed between the two supplies is adjusted with potentiometer 104 so that, at maximum current deviation, the maximum required amplitude error correction signal is generated. At the same time, the maximum anticipated voltage drift between the two power supplies is noted and the correction signal is again scaled using potentiometer 110 in drift control circuit 64 to provide the maximum required correction signal to amplifiers 114 and 116 so that the maximum required correction signal is generated in response to the full expected voltage drift.

The universality of the load share system is also facilitated by tying the entire load share system to the sensing circuit of the power supply units through the common ground 40. In this way, regardless of the voltage across the load $R_L$ 12 or the current through it, the load share system always operates about ground level to produce correction signals.

Regarding current deviation detector 50, FIG. 3A, if at any time during operation the correction signal on line 140 exceeds a given positive or negative value, e.g. 0.51 volts window comparator 66 provides a signal to trip latch 68 which ceases operation of ramp generator 72 and cuts off the gain signal on line 130. This automatically drops signal $I_4$ to zero and stops all further correction. When it is desired to restart the system, reset switch 70 is operated to reset latch 68 and once again operate ramp generator 72. Ramp generator 72 is designed to slowly increase the value of the gain factor G on line 130 so that the correction signal grows gradually and does not overexcite the system and cause the two power supplies to oscillate or hunt while seeking to balance their current outputs. The slope limit circuit 74 includes a zener diode 132 which simply limits the maximum level of output from ramp generator 72 typically, for example, to 2½ volts.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A load share system, comprising:

means, connectable to the power outputs of two power supplies, for determining any deviation of the output currents relative to each other;

means for providing a correction signal representative of said deviation; and means, responsive to said correction signal, for generating two balance signals of similar magnitude and opposite polarity and for delivering one of said balance signals to a sense input of one power supply and the other balance signal to a sense input of the other power supply to balance the power outputs.

2. The system of claim 1 in which said means for determining includes means for distinguishing any discrepancy between at least one of the output currents and the average of them.

3. The system of claim 2 in which said means for distinguishing includes means for obtaining the ratio of one of the output currents to the average of them.

4. The system of claim 2 in which said means for providing includes means for combining said discrepancy with a gain factor to produce a deviation signal.

5. The system of claim 4 in which said means for providing further includes means for diminishing said deviation signal by said gain factor to provide said correction signal.

6. The system of claim 5 in which said means for providing further includes means for controlling the magnitude of said correction signal to adjust the sensitivity of said load share system to deviations in current.

7. The system of claim 5 in which said means for providing further includes means, responsive to said means for diminishing, for adjusting the voltage of said correction signal to set the maximum voltage drift between said power supply accommodatable by said load share system.

8. The system of claim 5 further including a gain factor circuit having a gain generator for providing said gain factor.

9. The system of claim 8 in which said gain factor circuit further includes a start switch for initiating said gain generator to provide said gain factor.

10. The system of claim 9 in which said gain generator includes a ramp generator, responsive to said start switch, for slowly increasing said gain factor until it reaches a predetermined level.

11. The system of claim 8 further including a comparator circuit for disabling said gain generator when said correction signal exceeds a predetermined amount.

12. The system of claim 1 further including means, responsive to the magnitude of said balance signals, for detecting a fault in said control system.

13. The system of claim 12 in which said fault detecting means includes a window comparator which determines when said magnitude exceeds a preselected level.

14. The system of claim 12 further including means, responsive to said fault detecting means, for disconnecting said means for generating from the power supplies.

15. The system of claim 14 in which said means for disconnecting includes means for reconnecting said sense inputs directly to the load powerable by the power supplies.

16. The system of claim 1 in which said means for generating delivers said balance signals to the negative sense inputs of the power supplies.

17. The system of claim 1 in which said balance signals are substantially identical in magnitude.

18. A load share system, comprising:

means, connectable to the power outputs of two power supplies, for determining any deviation of the output currents relative to each other by obtaining the ratio of one of the output currents to the average of them;

means for providing a correction signal representative of said deviation by multiplying said ratio with a gain factor and subtracting said gain factor from the product; and means, responsive to said correction signals, for generating two balance signals of similar magnitude and opposite polarity and for delivering one of said balance signals to a sense input of one power supply and the other balance signal to a sense input of the other power supply to balance the power outputs.

19. The system of claim 18 further including a gain factor circuit having a gain generator for providing said gain factor.

20. The system of claim 19 in which said gain factor circuit further includes a start switch for initiating said gain generator to provide said gain factor.

21. The system of claim 20 in which said gain generator includes a ramp generator, responsive to said start switch, for slowly increasing said gain factor until it reaches a predetermined level.

22. The system of claim 21 further including a comparator circuit for disabling said gain generator when said correction signal exceeds a predetermined amount.

23. The system of claim 18 in which said means for providing includes means for controlling the magnitude of the current of said correction signal to adjust the sensitivity of said load share system to deviations in current.

24. The system of claim 18 in which said means for providing includes means for adjusting the voltage of said correction signal to set the maximum voltage drift between said power supplies accommodatable by said load share system.

25. The system of claim 18 further including means, responsive to the magnitude of said balance signals, for detecting a fault in said control system.

26. A load share system for use with two power supplies each having positive and negative sense terminals, comprising:

first means, interconnected with one of said sense terminals of one polarity at each power supply for remotely sensing the voltage at the load;

means, connectable to the power outputs of two power supplies, for determining any deviation of the output currents relative to each other;

means for providing a correction signal representative of said deviation; and means, responsive to said correction signal, for generating two balance signals of similar magnitude and opposite polarity and for delivering one of said balance signals to the other of said sense terminals of the other polarity of one power supply and the other balance signal to said sense terminal of that other polarity of the other power supply to imply that there has been a voltage change across the load and initiate an equal and opposite change in the amount of current each power supply delivers to the load.

27. A method for balancing the current, power and voltage supplied by two power supplies each having positive and negative sense terminals comprising:

determining the voltage at the load by interconnecting one of said sense terminals of one polarity for remote sensing of the voltage on the load;

determining any deviation of the output currents of the power supplies relative to each other;

providing a correction signal representative of such deviation; and generating two balance signals of similar magnitude and opposite polarity and delivering one of said balance signals to the other of said sense terminals of the other polarity of one power supply and the other balance signal to said sense terminal of that other polarity of the other power supply to imply that there has been a voltage change across the load and to initiate and equal and opposite change in current each power supply delivers to the load.

* * * * *